US012742421B1

(12) United States Patent
Justice et al.

(10) Patent No.: US 12,742,421 B1
(45) Date of Patent: Sep. 22, 2026

(54) PROPELLANT CARTRIDGE IGNITOR

(71) Applicant: RTX Corporation, Farmington, CT (US)

(72) Inventors: Andrew W. Justice, Tolland, CT (US); Steven W. Burd, Cheshire, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/428,611

(22) Filed: Dec. 22, 2025

(51) Int. Cl.
*F02C 7/272* (2006.01)
*F02C 7/266* (2006.01)

(52) U.S. Cl.
CPC .............. *F02C 7/272* (2013.01); *F02C 7/266* (2013.01)

(58) Field of Classification Search
CPC .......... F02C 7/272; F02C 7/266; F02C 7/264; H01T 13/22; F02K 9/95
See application file for complete search history.

(56) References Cited

U.S. PATENT DOCUMENTS

| | | | | |
|---|---|---|---|---|
| 8,783,009 | B2 | 7/2014 | Khosid et al. | |
| 8,950,329 | B2 | 2/2015 | Villarreal et al. | |
| 10,145,337 | B2 | 12/2018 | Summers et al. | |
| 10,371,099 | B2 | 8/2019 | Peltz et al. | |
| 10,808,649 | B2 | 10/2020 | Villarreal et al. | |
| 2009/0139206 | A1* | 6/2009 | Spanjers | F02K 9/88 60/204 |
| 2019/0338709 | A1* | 11/2019 | Thiriet | F02C 7/36 |
| 2021/0215100 | A1* | 7/2021 | Head | F23R 3/045 |
| 2024/0133771 | A1* | 4/2024 | Kojima | F23R 3/00 |

* cited by examiner

*Primary Examiner* — Phutthiwat Wongwian
*Assistant Examiner* — Jacek Lisowski
(74) *Attorney, Agent, or Firm* — Bachman & LaPointe, P.C.

(57) ABSTRACT

A start mechanism ignitor for a propulsion system combustor including a propellant cartridge comprising cartridge walls forming a cartridge interior, an interface formed within the cartridge interior separating a first chamber from a second chamber within the cartridge interior; a propellant material disposed within the cartridge interior; and an ignition chamber fluidly coupled with the cartridge interior.

20 Claims, 4 Drawing Sheets

PROPELLANT CARTRIDGE IGNITOR

BACKGROUND

The present disclosure is directed to the improved start mechanism for small engines. Particularly, an ignition cartridge.

For a prior art small engine E as shown in FIG. 1, the gas turbine engine E includes a starter system with a pyrotechnic device and sometimes a volume of compressed air or rapidly expanding gas to initially start the gas turbine engine E. The system components of this start system may be coupled to the engine, as shown as component (cartridge) V attached to the small engine E. The separate component (cartridge) V adds weight, cost and part count to the small engine design.

SUMMARY

In accordance with the present disclosure, there is provided a start mechanism ignitor for a propulsion system combustor comprising a propellant cartridge comprising cartridge walls forming a cartridge interior, an interface formed within the cartridge interior separating a first chamber from a second chamber within the cartridge interior; a propellant material disposed within the cartridge interior; and an ignition chamber fluidly coupled with the cartridge interior.

A further embodiment of any of the foregoing embodiments may additionally and/or alternatively include the propellant material comprises a fuel material and an oxidizer material, the fuel material disposed in the first chamber and the oxidizer disposed in the second chamber.

A further embodiment of any of the foregoing embodiments may additionally and/or alternatively include the propellant cartridge comprises an orifice that is open for fluid communication between the cartridge interior and a combustion chamber downstream from the orifice.

A further embodiment of any of the foregoing embodiments may additionally and/or alternatively include the start mechanism ignitor for a propulsion system combustor further comprising an auxiliary canister fluidly coupled with the cartridge interior; and a combustible material disposed within the auxiliary canister.

A further embodiment of any of the foregoing embodiments may additionally and/or alternatively include the start mechanism ignitor for a propulsion system combustor further comprising an electrical element in operative communication with the cartridge interior, the electrical element configured, upon activation, to release the material from the first chamber and the second chamber by creating an opening in the cartridge wall that divides an ignition chamber from the first chamber and the second chamber.

A further embodiment of any of the foregoing embodiments may additionally and/or alternatively include the electrical element is configured to ignite a fuel and an oxidizer in the ignition chamber; the electrical element configured to provide a catalyst and/or energy to ignite a reaction between the fuel and the oxidizer in the ignition chamber.

A further embodiment of any of the foregoing embodiments may additionally and/or alternatively include the propellant material comprises materials to maintain an inert liquid/gas phase prior to ignition and subsequently ignite responsive to exposure to an electrical element within the cartridge.

In accordance with the present disclosure, there is provided a propulsion system having a start mechanism ignitor comprising a case supporting a combustion section having a combustor, the combustor including a combustor casing; a fuel injector attached to the combustor casing; a propellant cartridge attached to the case, the propellant cartridge comprising cartridge walls forming a cartridge interior; an interface formed within the cartridge interior separating a first chamber from a second chamber within the cartridge interior; and a propellant material disposed within the cartridge interior, wherein the cartridge interior is fluidly coupled with the combustor.

A further embodiment of any of the foregoing embodiments may additionally and/or alternatively include the propulsion system having the start mechanism ignitor further comprising an orifice formed in the cartridge wall, the orifice is open for fluid communication between the cartridge interior and the combustion chamber downstream from the orifice.

A further embodiment of any of the foregoing embodiments may additionally and/or alternatively include an ignition chamber fluidly coupled with the cartridge interior upstream of the combustor.

A further embodiment of any of the foregoing embodiments may additionally and/or alternatively include the propulsion system having the start mechanism ignitor further comprising an auxiliary canister fluidly coupled with the cartridge interior upstream of the combustor; and a combustible material disposed within the auxiliary canister.

A further embodiment of any of the foregoing embodiments may additionally and/or alternatively include the propulsion system having the start mechanism ignitor further comprising an electrical element in operative communication with the cartridge interior, the electrical element configured, upon activation, to release the material from the first chamber and the second chamber by creating an opening in the cartridge wall that divides an ignition chamber from the first chamber and the second chamber.

A further embodiment of any of the foregoing embodiments may additionally and/or alternatively include the propellant material comprises a fuel material and an oxidizer material, the fuel material disposed in the first chamber and the oxidizer disposed in the second chamber.

In accordance with the present disclosure, there is provided a process of forming a propulsion system having a start mechanism ignitor comprising forming a case supporting a combustion section having a combustor; fluidly coupling a fuel injector to a combustor casing; attaching a propellant cartridge to the case, the propellant cartridge comprising cartridge walls forming a cartridge interior; forming an interface within the cartridge interior separating a first chamber from a second chamber within the cartridge interior; an ignition chamber fluidly coupled with the cartridge interior; the ignition chamber fluidly coupled upstream from the combustor; and disposing a propellant material within the cartridge interior, wherein the cartridge interior is fluidly coupled with the combustor.

A further embodiment of any of the foregoing embodiments may additionally and/or alternatively include the process further comprising forming an orifice in the cartridge wall, fluidly coupling the orifice between the ignition chamber and the combustion chamber downstream from the orifice.

A further embodiment of any of the foregoing embodiments may additionally and/or alternatively include the process further comprising fluidly coupling an auxiliary canister with the ignition chamber upstream of the combustor; and a combustible material disposed within the auxiliary canister.

A further embodiment of any of the foregoing embodiments may additionally and/or alternatively include the process further comprising coupling an electrical element in operative communication with the cartridge interior; configuring the electrical element, upon activation, to release the material from the first chamber and the second chamber by creating an opening in the cartridge wall that divides an ignition chamber from the first chamber and the second chamber.

A further embodiment of any of the foregoing embodiments may additionally and/or alternatively include the process further comprising configuring an electrical element to ignite a released fuel material and oxidizer in the ignition chamber; configuring the electrical element to provide a catalyst and/or energy to ignite a reaction between the fuel and oxidizer in the ignition chamber.

A further embodiment of any of the foregoing embodiments may additionally and/or alternatively include the process further comprising forming the propellant material comprising a fuel material separate from an oxidizer material; disposing the fuel material the first chamber; and disposing the oxidizer in the second chamber; wherein the fuel is selected from the group comprising jet A, JP-10, H2, ethylene, and suspended metal medial.

A further embodiment of any of the foregoing embodiments may additionally and/or alternatively include the process further comprising forming the propellant material comprising an inert phase prior to an ignition and configured to subsequently ignite responsive to exposure to an electrical element.

Other details of the propellant cartridge ignitor are set forth in the following detailed description and the accompanying drawings wherein like reference numerals depict like elements.

BRIEF DESCRIPTION OF THE DRAWINGS

The above and further advantages of this disclosure may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. The embodiments shown in the individual figures are not limiting and can be combined to reflect a blended concept. For clarity, not every element may be labeled in every figure. The drawings are not necessarily to scale, emphasis instead being placed upon illustrating the principles of the disclosure.

DETAILED DESCRIPTION

Figure 1:
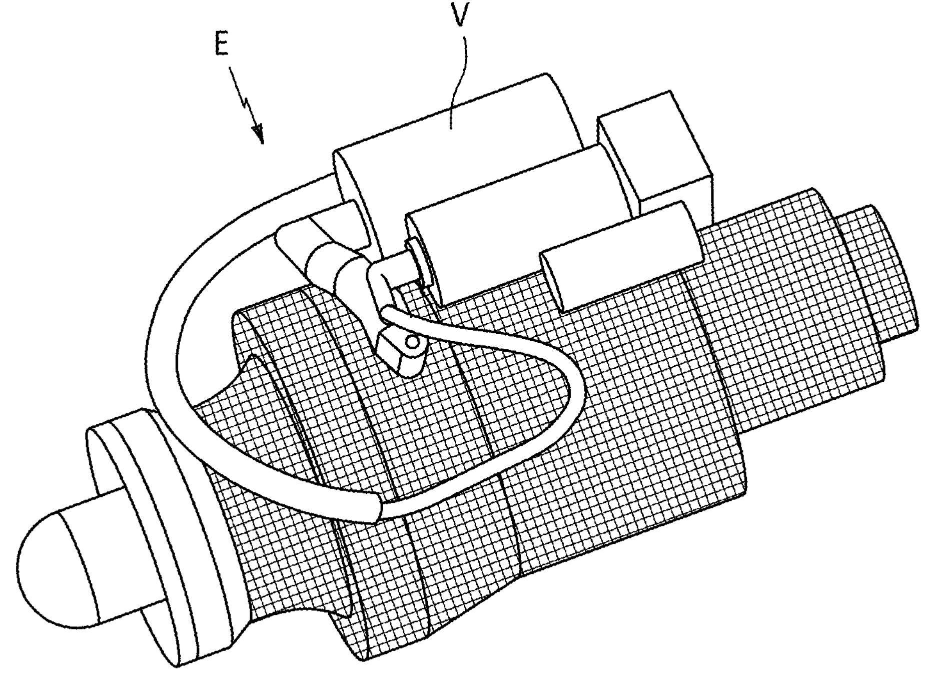
FIG. 1 is an isometric view of a schematic representation of a prior art gas turbine engine.
Figure 2:
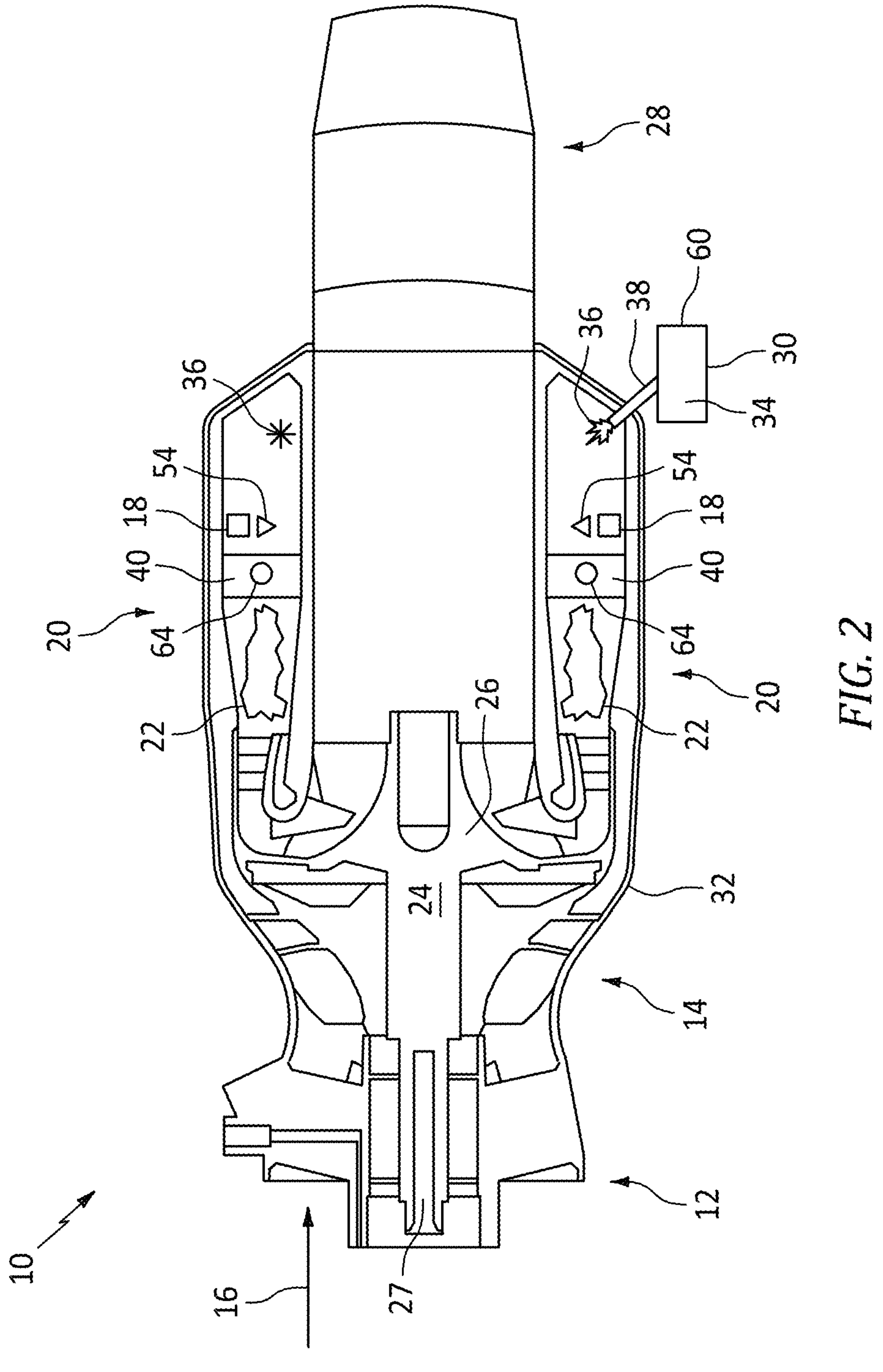
FIG. 2 is a cross sectional view schematic representation of an exemplary gas turbine engine with start mechanism.

Referring now to FIG. 2, there is illustrated an exemplary gas turbine engine, specifically a turbojet engine 10. The gas turbine engine 10 includes an inlet section 12 upstream of a compressor section 14 where air 16 is drawn in and compressed. Fuel 18 is injected into a combustion section 20 downstream of the compressor section 14. The air 16 is mixed with fuel 18 and burned in the combustion section 20. The combusted fuel 18 and air 16 are combined into a highly energized combustion product 22 (products of combustion 22) that expands through a turbine section 24. The products of combustion 22 move downstream over turbine rotors 26, driving the turbine rotors 26 to rotate creating rotary power. The rotary power can be used to spin the compressor 14 and/or power the generator 27. The products of combustion 22 move downstream and exit the turbine section 24 to the exhaust nozzle section 28 where engine thrust is developed for propulsion. The engine 10 may also include the generator 27 such as an anterior-mounted, permanent magnet generator (PMG). Though illustrated as a turbojet engine, this is not intended to be so limiting, and the start systems described herein may also be applied to other turbine engines, such as turbofans, propfans, etc., or to other combustion and propulsion devices including rotating detonation combustors, augmenters, ramjets or ramburners, scramjets, and the like.

An exemplary start mechanism 30 can be attached to a case 32 near the combustion section 20. The start mechanism 30 can be constructed from materials that can maintain a gas/liquid phase, be inert prior to ignition and subsequently ignite due to a chemical reaction. The start mechanism 30 can be designed to induce sparking and engine ignition. The start mechanism 30 can include liquid/gas propellant materials 34 that can create energized ignition gas 36 that can propagate along a flow path 38 into the combustion section 20. The start mechanism 30 can include the propellant materials 34 that are an inert material in normal environments. It is desirable to formulate the start mechanism 30 from materials that are not considered to be explosive to avoid an explosive designation of pyrotechnic igniters and/or to extend a shelf life of the start mechanism.

Figure 3:
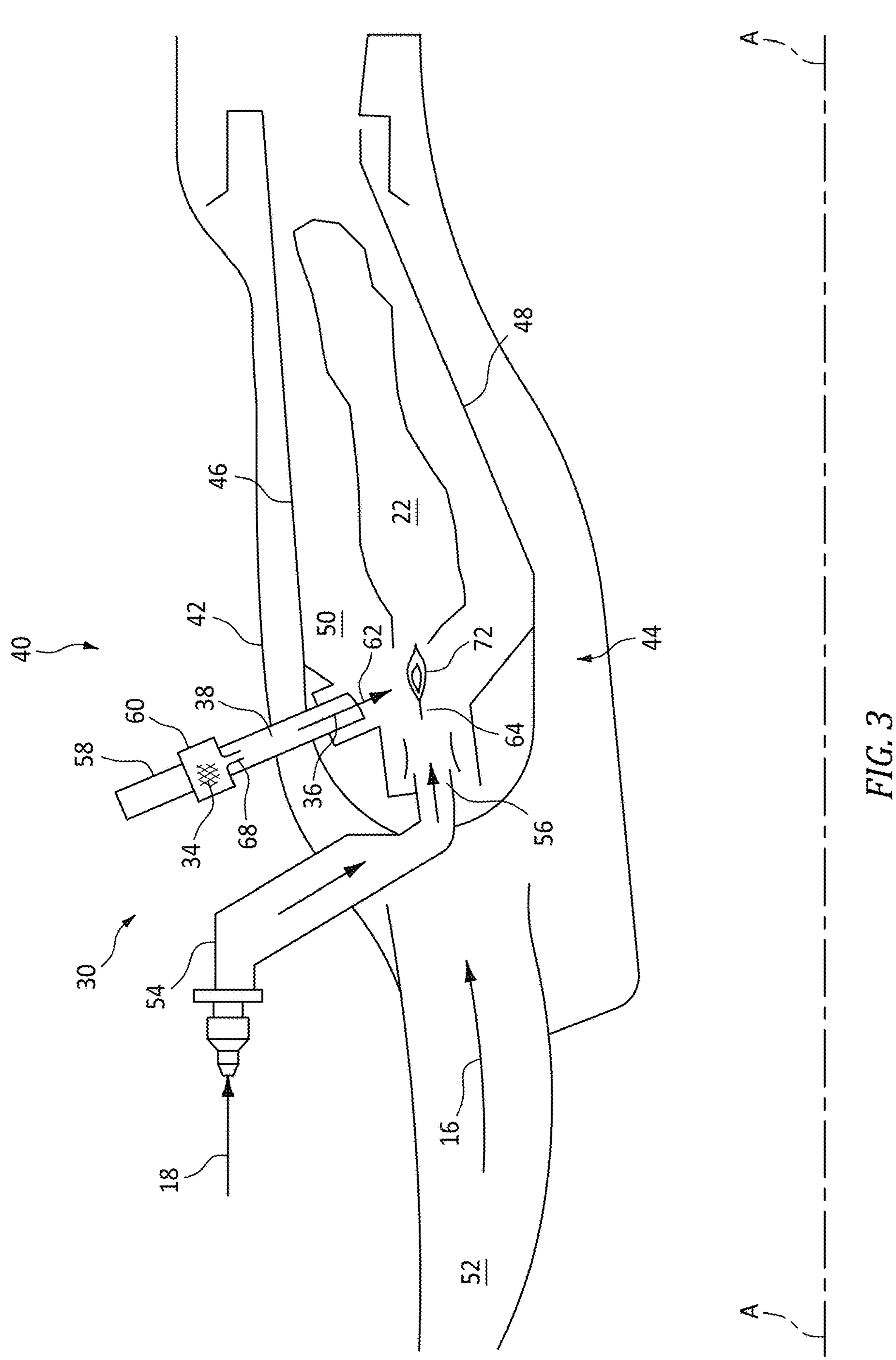
FIG. 3 is a cross sectional view schematic representation of a combustor with an exemplary start mechanism igniter.

Referring also to FIG. 3, showing the exemplary start mechanism with ignitor 58. The combustor 40 can include a combustor casing 42. The combustor casing 42 encloses a combustor liner 44. The combustor liner 44 includes an outer liner 46 and an inner liner 48 enclosing a combustion chamber 50. The outer liner 46 and inner liner 48 are radially relative to a central axis A. The combustor 40 includes a diffuser 52 upstream of the combustor liner 44. The diffuser 52 supplies air 16 into the combustor 40. The combustor 40 includes a fuel injector 54 fluidly coupled with a nozzle 56. The fuel injector 54 supplies the liquid fuel 18 into the combustor 40 through the nozzle 56. The combustor 40 includes an ignitor 58 in operative communication with the combustion chamber 50. The igniter 58 can include the start mechanism 30. The igniter 58 is part of the start mechanism 30 that introduces energy required to ignite the fuel and air mixture in the combustor 40.

The start mechanism 30 can be formed as a cartridge 60. The cartridge 60 provides an ignition source 62, such as a deflagrative flame, into the combustion chamber 50 near the nozzle 56. The ignition source 62 ignites the liquid fuel 18 air 16 mixture 64 near the nozzle 56 to create the combustion product 22.

The ignition cartridge 60 can be placed in operative communication with the combustion section 20. In exemplary embodiments the ignition cartridge 60 can be placed in operative communication with the nozzle 56 either upstream or downstream. The ignition cartridge 60 can be placed downstream from the injector 54. The ignition cartridge 60 can be placed downstream from the ignitor 58, in alternative embodiments. The igniter 58 can be used to ignite the propellant materials 34 within the ignition cartridge 60. In another embodiment an electrical element 66 (see FIGS. 4-7) can create sparks to light the propellant materials 34 within the ignition cartridge 60 directly.

The ignition cartridge 60 can be fluidly coupled to the nozzle 56. Referring also to FIGS. 4-8, the ignition cartridge 60 can include an orifice 68 that is open for fluid communication between a cartridge interior 70 and the combustion chamber 50 downstream from the orifice 68. The orifice 68 can be shaped with a converging-diverging cross sectional flow area. The orifice 68 can be shaped to produce a back-pressure on the propellant materials 34 during reactions. The orifice 68 can be shaped to produce a high velocity acceleration of the ignition source 62 emitted from the cartridge 60. The orifice 68 can be sized to allow for the ignition source 62 to flow into the combustion chamber 50 to produce the combustion product 22 flow upon initiation of the fuel air mixture 64 in a sustainable rate that maintains combustion of a primary flame 72. The primary flame 72 is the flame that results from the initial combustion of the fuel air mixture 64 at ignition near the nozzle 56.

The ignition cartridge 60 can include cartridge wall 74 that defines the cartridge interior 70. The cartridge wall 74 can support the propellant materials 34. In the embodiment shown at FIG. 4, the propellant materials 34 can occupy the cartridge interior 70. In an exemplary embodiment, the propellant materials 34 can fill the cartridge interior 70. The electrical element 66 can be located near the propellant materials 34 and the orifice 68.

The ignition cartridge 60 can include a first chamber 76 and a second chamber 78 within the cartridge interior 70. The first chamber 76 can be separated from the second chamber 78 by a divider or interface 80. The interface 80 can be a portion of the cartridge wall 74. An ignition chamber 82 can be attached to the cartridge interior 70. The ignition chamber 82 can share a common cartridge wall 74 with each of the first chamber 76 and the second chamber 78. The ignition chamber 82 can be in operative communication with the electrical element 66. The electrical element 66 can actuate within the ignition chamber 82.

The propellant materials 34 can be located within the first chamber 76 and second chamber 78. The first chamber 76 can contain a fuel 84, such as jet A, JP-10, H2, ethylene, suspended metal medial and the like. The suspended metal media can include alkali metals (group 1) and/or alkaline earth metals (group 2). The second chamber 78 can contain an oxidizer material 86. The contents of the first chamber 76 and the second chamber 78 can be pressurized to a predetermined pressure and conditioned to package in their respective chambers 76, 78.

Figures 4, 5, 6, 7, 8:
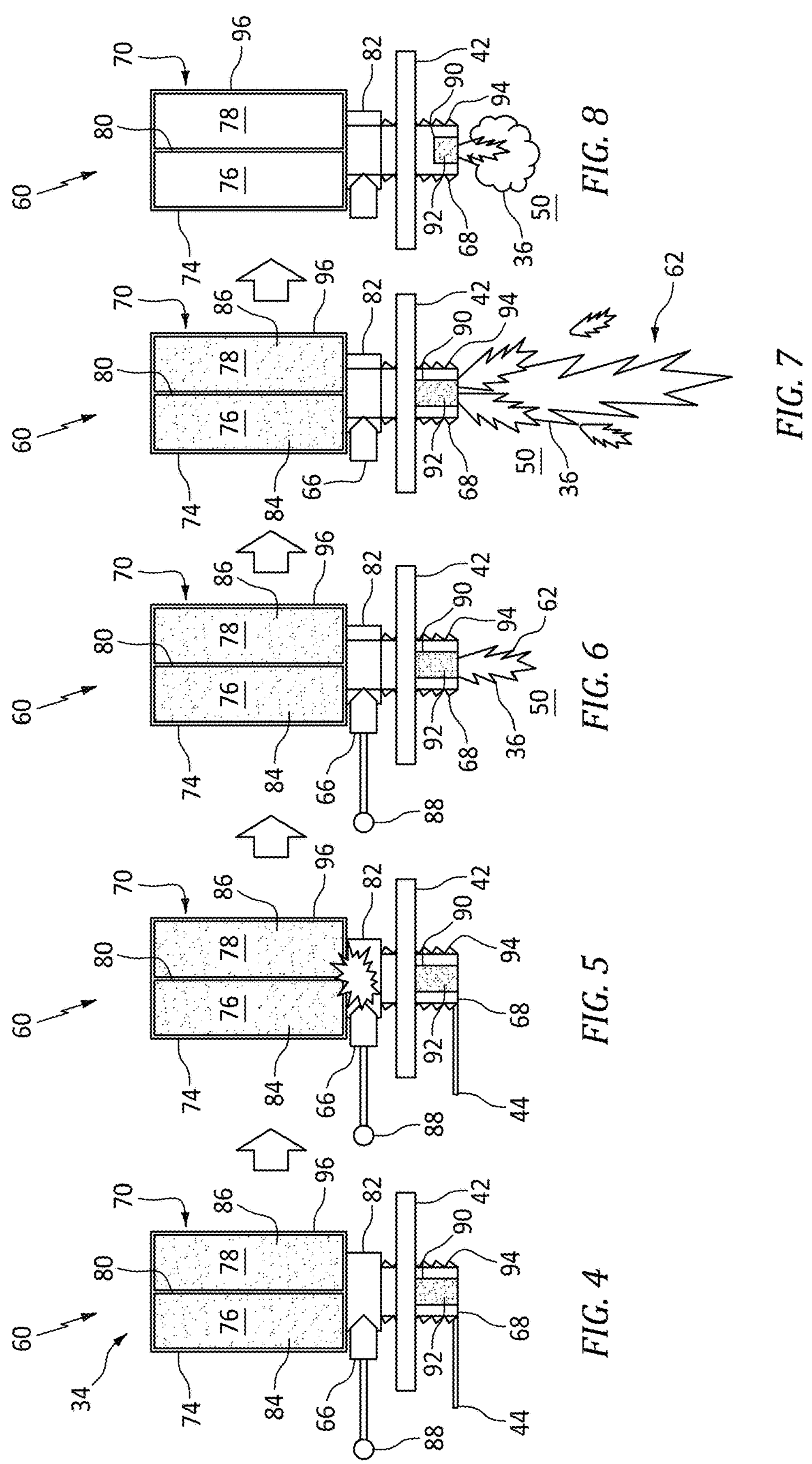
FIG. 4 is a cross sectional view schematic representation of an exemplary start mechanism cartridge ignitor in a dormant stage.
FIG. 5 is a cross sectional view schematic representation of the exemplary start mechanism cartridge ignitor at ignition.
FIG. 6 is a cross sectional view schematic representation of the exemplary start mechanism cartridge ignitor during a first phase of activation.
FIG. 7 is a cross sectional view schematic representation of the exemplary start mechanism cartridge ignitor during a second phase of activation.
FIG. 8 is a cross sectional view schematic representation of the exemplary start mechanism cartridge ignitor during a phase of deactivation.

In the embodiment shown at FIG. 5, the cartridge wall 74 is shown being breached. The electrical element 66 can produce enough energy to breach/puncture the wall 74 that divides the ignition chamber 82 the cartridge interior 70 (e.g., the first chamber 76 and second chamber 78). An electrical source 88 can be in electrical communication with the electrical element 66. The electrical source 88 can provide the electrical energy to the electrical element 66. After the cartridge wall 74 is breached, the contents of the first chamber 76 and second chamber 78 are released to flow out of the chambers 76, 78 and mix. The fuel 84 can flow out of the first chamber 76. The oxidizer 86 can flow out of the second chamber 78. The fuel 84 and oxidizer 86 can ignite due to exposure to the electrical element 66 providing spark/heat/catalyst to ignite a reaction between the fuel 84 and oxidizer 86 in the ignition chamber 82. The reaction can be an exothermic reaction that releases the energized ignition gas 36 to flow through the flow path 38 into the combustor 40.

The embodiment shown in FIG. 6 shows the next progression in the next phase of activation. The energized ignition gas 36 can be seen flowing out of the cartridge 60 through the orifice 68. The propellant materials 34 can continue to react at this stage.

An auxiliary canister 90 can be attached to the cartridge 60 downstream of the cartridge interior 70 and near the orifice 68. The auxiliary canister 90 can contain combustible material 92. The combustible material 92 can be similar to the fuel 84, including metals that can enhance exothermic reactions within the energized ignition gas 36. The combustible material 92 can contribute to exothermic reactions, release additional energy to increase the net energy of the energized ignition gas 36 or expand the size of the region of released ignition products. The materials of the combustible material 92 can produce oxides, hydrogen and the like when reacted. The combustible material 92 can be transported into the combustor 40 to promote the fuel/air mixture 64 ignition as well as enhance the combustion product 22 with heat/energy.

As seen in FIG. 7, the energized ignition gas 36 can be seen exiting the orifice 68. The energized ignition gas 36 can include both the reactants from the fuel 84 and oxidizer 86 as well as the combustible material 92 enhancing the reactions.

As seen in FIG. 8, the energized ignition gas 36 is at an end of life. The fuel 84 and oxidizer 86 have been exhausted. There is little to no more combustible material 92 remaining to react with the energized ignition gas 36. The first chamber 76 and the second chamber 78 are depleted or empty. At the depletion of the fuel 84, the oxidizer 86, and, when included, the combustible material 92, the combustor 40 of the gas turbine engine 10 may be self-sustaining, such that the fuel 18 introduced into the combustion chamber 50 along with the air 16 may sustain the products of combustion 22.

The cartridge 60 can be attached to the case 42 or other structure by use of threads 94 on an exterior 96 of the cartridge wall 74 or ignition chamber 82. The cartridge 60 can be attached via the threads 94 to the ignitor 58, combustor casing 42 and the like.

The propellant material 34 can be constructed from materials that can maintain a liquid/gas phase, be inert or stored prior to ignition and subsequently ignite responsive to exposure to the electrical element 66. The propellant material 34 can be a liquid/gaseous fuel material. The propellant material 34 can include the fuel 84 and incorporate the oxidizer 86. The propellant material 34 can include liquid or gaseous fuel 84 that is a generally inert material in normal environments. The high temperature of the electrical element 66 can initiate a reaction in the propellant material 34. The propellant material 34 can comprise a material such as the oxidizer 86 (e.g., oxygen) and therefore does not require additional airflow to sustain the reaction.

The propellant material 34 can be configured to be consumed via combustion after ignition. The propellant material 34 can be configured to contribute to the combustion product 22 and enhance the quantity of thermal energy and ultimately kinetic and thermal energy into the engine 10 at startup.

In operation, the start mechanism ignitor 30 can be idle prior to the need for engine 10 startup. The propellant material 34 can be inert and have a long storage life under normal storage conditions. Upon startup of the engine 10, the engine 10 receives low airflow of air 16 through the nozzle 56. A fuel 18 flow can begin through the fuel injector 54. The electrical element 66 can energize and provide the ignition source 62, such as a deflagrative flame proximate the fuel air mixture 64 within the nozzle 56. The primary flame 72 is ignited and provides enough energy to turn the rotor 26 of the turbine section 24. The engine 10 can spool up to full power. The propellant material 34 can be fully consumed. The primary flame 72 can be fully operational to produce the combustion products 22. The engine 10 can operate at a normal running speed and provide enough air flow and fuel supply to operate with a self-sustaining full power primary flame 72.

A technical advantage of the disclosed propellant cartridge ignitor includes a simple compact, manufacturable and reliable ignition source.

Another technical advantage of the disclosed propellant cartridge ignitor includes a compact device for simple installation and packaging in an engine design.

Another technical advantage of the disclosed propellant cartridge ignitor includes a solid propellant used in the device with no external plumbing.

There has been provided a propellant cartridge ignitor. While the propellant cartridge ignitor has been described in the context of specific embodiments thereof, other unforeseen alternatives, modifications, and variations may become apparent to those skilled in the art having read the foregoing description. The embodiments can be interchanged and combined. Accordingly, it is intended to embrace those alternatives, modifications, and variations which fall within the broad scope of the appended claims.

What is claimed is:

1. A start mechanism ignitor for a propulsion system combustor comprising:
- a propellant cartridge comprising cartridge walls forming a cartridge interior, an interface formed within the cartridge interior separating a first chamber from a second chamber within the cartridge interior;
- a propellant material disposed within the cartridge interior; and
- an ignition chamber fluidly coupled with the cartridge interior.

2. The start mechanism ignitor for the propulsion system combustor according to claim 1, wherein the propellant material comprises a fuel material and an oxidizer material, the fuel material disposed in the first chamber and the oxidizer disposed in the second chamber.

3. The start mechanism ignitor for the propulsion system combustor according to claim 1, wherein the propellant cartridge comprises an orifice that is open for fluid communication between the cartridge interior and a combustion chamber downstream from the orifice.

4. The start mechanism ignitor for the propulsion system combustor according to claim 1, further comprising:
- an auxiliary canister fluidly coupled with the cartridge interior; and
- a combustible material disposed within the auxiliary canister.

5. The start mechanism ignitor for the propulsion system combustor according to claim 1, further comprising:
- an electrical element in operative communication with the cartridge interior, the electrical element configured, upon activation, to release the propellant material from the first chamber and the second chamber by creating an opening in the cartridge wall that divides the ignition chamber from the first chamber and the second chamber.

6. The start mechanism ignitor for the propulsion system combustor according to claim 5, wherein the electrical element is configured to ignite a fuel and an oxidizer in the ignition chamber; the electrical element configured to provide a catalyst and/or energy to ignite a reaction between the fuel and the oxidizer in the ignition chamber.

7. The start mechanism ignitor for the propulsion system combustor according to claim 1, wherein the propellant material and propellant cartridge comprises materials to maintain an inert liquid/gas phase prior to ignition and subsequently ignite responsive to mixing and exposure to an electrical element within the propellant cartridge.

8. A propulsion system having a start mechanism ignitor comprising:
- a case supporting a combustion section having a combustor, the combustor including a combustor casing;
- a fuel injector attached to the combustor casing;
- a propellant cartridge attached to the case, the cartridge comprising cartridge walls forming a cartridge interior;
- an interface formed within the cartridge interior separating a first chamber from a second chamber within the cartridge interior; and
- a propellant material disposed within the cartridge interior, wherein the cartridge interior is fluidly coupled with the combustor.

9. The propulsion system having the start mechanism ignitor according to claim 8, further comprising:
- an orifice formed in the cartridge wall, the orifice being open for fluid communication between the cartridge interior and the combustion chamber downstream from the orifice.

10. The propulsion system having the start mechanism ignitor according to claim 8, further comprising:
- an ignition chamber fluidly coupled with the cartridge interior upstream of the combustor.

11. The propulsion system having the start mechanism ignitor according to claim 8, further comprising:
- an auxiliary canister fluidly coupled with the cartridge interior upstream of the combustor; and
- a combustible material disposed within the auxiliary canister.

12. The propulsion system having the start mechanism ignitor according to claim 8, further comprising:
- an electrical element in operative communication with the cartridge interior, the electrical element configured, upon activation, to release the propellant material from the first chamber and the second chamber by creating an opening in the cartridge wall that divides an ignition chamber from the first chamber and the second chamber.

13. The propulsion system having the start mechanism ignitor according to claim 8, wherein the propellant material comprises a fuel material and an oxidizer material, the fuel material disposed in the first chamber and the oxidizer disposed in the second chamber.

14. A process of forming a propulsion system having a start mechanism ignitor comprising:
forming a case supporting a combustion section having a combustor;
fluidly coupling a fuel injector to a combustor casing;
attaching a propellant cartridge to the case, the cartridge comprising cartridge walls forming a cartridge interior;
forming an interface within the cartridge interior separating a first chamber from a second chamber within the cartridge interior;
an ignition chamber fluidly coupled with the cartridge interior; the ignition chamber fluidly coupled upstream from the combustor; and
disposing a propellant material within the cartridge interior, wherein the cartridge interior is fluidly coupled with the combustor.

15. The process of claim 14, further comprising:
forming an orifice in the cartridge wall, fluidly coupling the orifice between the ignition chamber and the combustion chamber downstream from the orifice.

16. The process of claim 14, further comprising:
fluidly coupling an auxiliary canister with the ignition chamber upstream of the combustor; and
disposing a combustible material within the auxiliary canister.

17. The process of claim 14, further comprising:
coupling an electrical element in operative communication with the cartridge interior;
configuring the electrical element, upon activation, to release the propellant material from the first chamber and the second chamber by creating an opening in the cartridge wall that divides an ignition chamber from the first chamber and the second chamber.

18. The process of claim 14, further comprising:
configuring an electrical element to ignite a released fuel and oxidizer in the ignition chamber;
configuring the electrical element to provide a catalyst and/or energy to ignite a reaction between the fuel and the oxidizer in the ignition chamber.

19. The process of claim 14, further comprising:
forming the propellant material comprising a fuel material separate from an oxidizer material;
disposing the fuel material in the first chamber; and
disposing the oxidizer in the second chamber; wherein the fuel material is selected from the group comprising jet A, JP-10, H2, ethylene, and suspended metal medial.

20. The process of claim 14, further comprising:
forming the propellant material comprising an inert phase prior to an ignition and configured to subsequently ignite responsive to exposure to an electrical element.

* * * * *